(12) United States Patent
Jakubowski et al.

(10) Patent No.: US 7,802,540 B2
(45) Date of Patent: Sep. 28, 2010

(54) COLLAPSIBLE SOFT CRATE FOR PET

(75) Inventors: Todd M. Jakubowski, Rutland, VT (US); Scott S. Jakubowski, Castleton, VT (US); Chris Jakubowski, Rutland Town, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 169 days.

(21) Appl. No.: 11/953,138

(22) Filed: Dec. 10, 2007

(65) Prior Publication Data

US 2008/0134985 A1    Jun. 12, 2008

Related U.S. Application Data

(60) Provisional application No. 60/873,640, filed on Dec. 8, 2006.

(51) Int. Cl.
  *A01K 1/03* (2006.01)
(52) U.S. Cl. .................................. 119/499; 119/497
(58) Field of Classification Search ................ 119/499, 119/498, 491, 482, 496, 497; *A01K 1/03*
  See application file for complete search history.

(56) References Cited

U.S. PATENT DOCUMENTS

| | | | |
|---|---|---|---|
| 6,408,797 B2 * | 6/2002 | Pivonka et al. | 119/498 |
| 7,021,242 B2 * | 4/2006 | Axelrod | 119/496 |
| 7,044,083 B2 * | 5/2006 | Farmer et al. | 119/474 |
| 7,380,521 B2 * | 6/2008 | Morton et al. | 119/499 |
| 7,455,032 B2 * | 11/2008 | Axelrod | 119/499 |
| 2005/0229866 A1 * | 10/2005 | Simpson et al. | 119/499 |
| 2006/0150917 A1 * | 7/2006 | Morton et al. | 119/498 |
| 2006/0174841 A1 * | 8/2006 | Axelrod | 119/498 |
| 2006/0219185 A1 * | 10/2006 | Larson | 119/482 |
| 2008/0121188 A1 * | 5/2008 | Axelrod et al. | 119/499 |
| 2009/0165730 A1 * | 7/2009 | Farmer et al. | 119/453 |

* cited by examiner

*Primary Examiner*—Son T Nguyen
*Assistant Examiner*—Shadi Baniani
(74) *Attorney, Agent, or Firm*—Volpe and Koenig, PC

(57) ABSTRACT

A collapsible soft crate comprising a frame having at least one top member, at least one bottom member, and at least two side members. The at least one top and bottom members are hinged along a length thereof. The at least one top member and the at least one bottom member are connected to the at least two side members. At least four panels are connected together and surround at least a portion of the frame. This configuration allows the crate to collapse more compactly than those in the art.

17 Claims, 19 Drawing Sheets

US 7,802,540 B2

COLLAPSIBLE SOFT CRATE FOR PET

CROSS REFERENCE TO RELATED APPLICATIONS

This application claims the benefit of U.S. Provisional Application 60/873,640, filed Dec. 8, 2006, which is incorporated herein by reference as if fully set forth.

FIELD OF INVENTION

This invention relates to the field of storage and transportation of pets.

BACKGROUND

Crates, cages and other similar apparatus for housing and transporting pets are well-known in the art. These cages and crates are rigid, often comprised of steel bars or hard plastic and therefore, provide a sturdy housing. But they take up a large amount of storage space and are not easy to transport. Further, the rigid steel bars or hard plastic may injure the pet if it is thrown against the walls of the crate, for example, during a sudden stop in a vehicle. These rigid bars also may damage objects that they come in contact with such as the interior of an automobile or furniture.

To overcome these problems, the industry developed "soft" pet enclosures comprised of a "soft" material such as canvas or nylon with a rigid, collapsible frame generally having a rigid bottom panel. While these known "soft" pet enclosures are collapsible for storage, they generally have a footprint defined by the bottom portion that is often large and unwieldy.

There is a need for a durable soft pet crate that is easily collapsible, and capable of becoming more compact than the known soft crates.

SUMMARY

In one aspect, the present invention provides a collapsible soft crate comprising a frame with at least one top member, at least one bottom member, and at least two side members. The at least one top and bottom members are hinged along a length thereof. The at least one top member and the at least one bottom member are connected to the at least two side members. At least four panels are connected together and surround at least a portion of the frame.

The present invention also provides a method of using a collapsible soft crate. The method comprises (a) providing a collapsible soft crate including a frame with at least one top member, at least one bottom member, and at least two side members; the at least one top and bottom members are hinged along their length; the at least one top member and the at least one bottom member are connected to the at least two side members; and at least four flexible panels are connected together and surround at least a portion of the frame; and (b) unlocking the hinges and folding the collapsible soft crate by moving the sides together from an expanded position to a collapsed position.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 2:
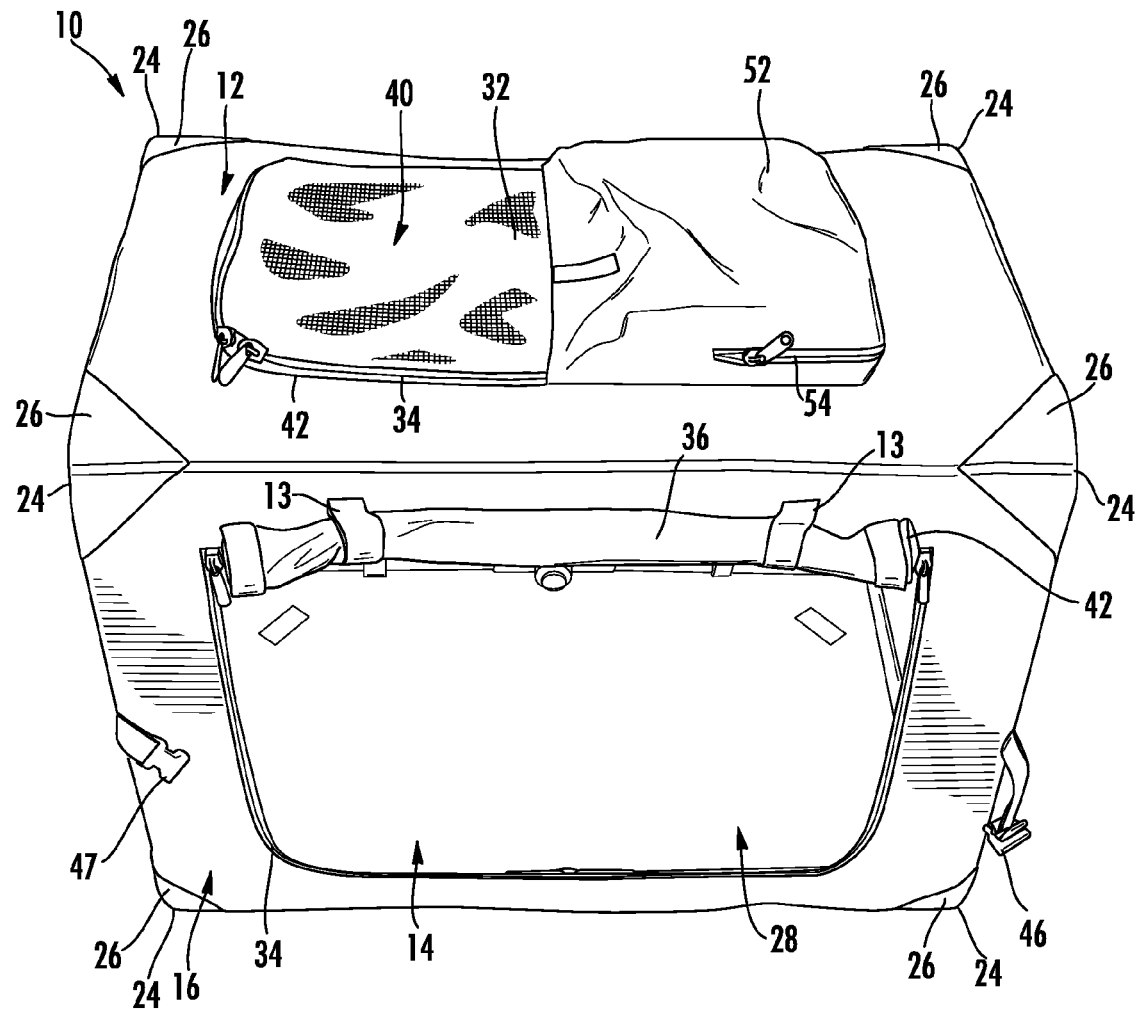
FIG. 2 is a front perspective view of the embodiment of the collapsible soft pet crate shown in FIG. 1 with the front panel opening open.

For purposes of this detailed description, words such as "front", "back", "top", "bottom", "left", and "right" designate directions based on FIG. 2 of the drawings, and are used for convenience in referring to the designated parts or areas.

FIGS. 1-19 show a preferred embodiment of the collapsible soft pet crate 10 of the present invention. The collapsible soft pet crate 10 is generally rectilinear, however, in other embodiments, it can be square, cylindrical or a pyramidal shape. The collapsible soft pet crate 10 is comprised of a cover made from six sides or panels, including a top 12, bottom 14, front 16 and back 18 and left-side 20 and right-side 22. Preferably, the panels 12, 14, 16, 18, 20 and 22 are comprised of 600 Denier Nylon, but may be comprised of other materials, preferably, soft, breathable, durable, flexible and preferably, machine washable fabrics that cannot be easily damaged by a pet by scratching, chewing, etc. Such materials may include plastic, woven nylon 6-6 fabric, such as that sold under the trade name CORDURA®, polyester, canvas, twill, vinyl, leather, cotton, etc. The panels are connected, preferably sewn to each other, and surround and are connected to a rigid, collapsible frame, as described in detail below. In another embodiment, there are no panels and the cover comprises one piece of soft, flexible material.

Figure 1:
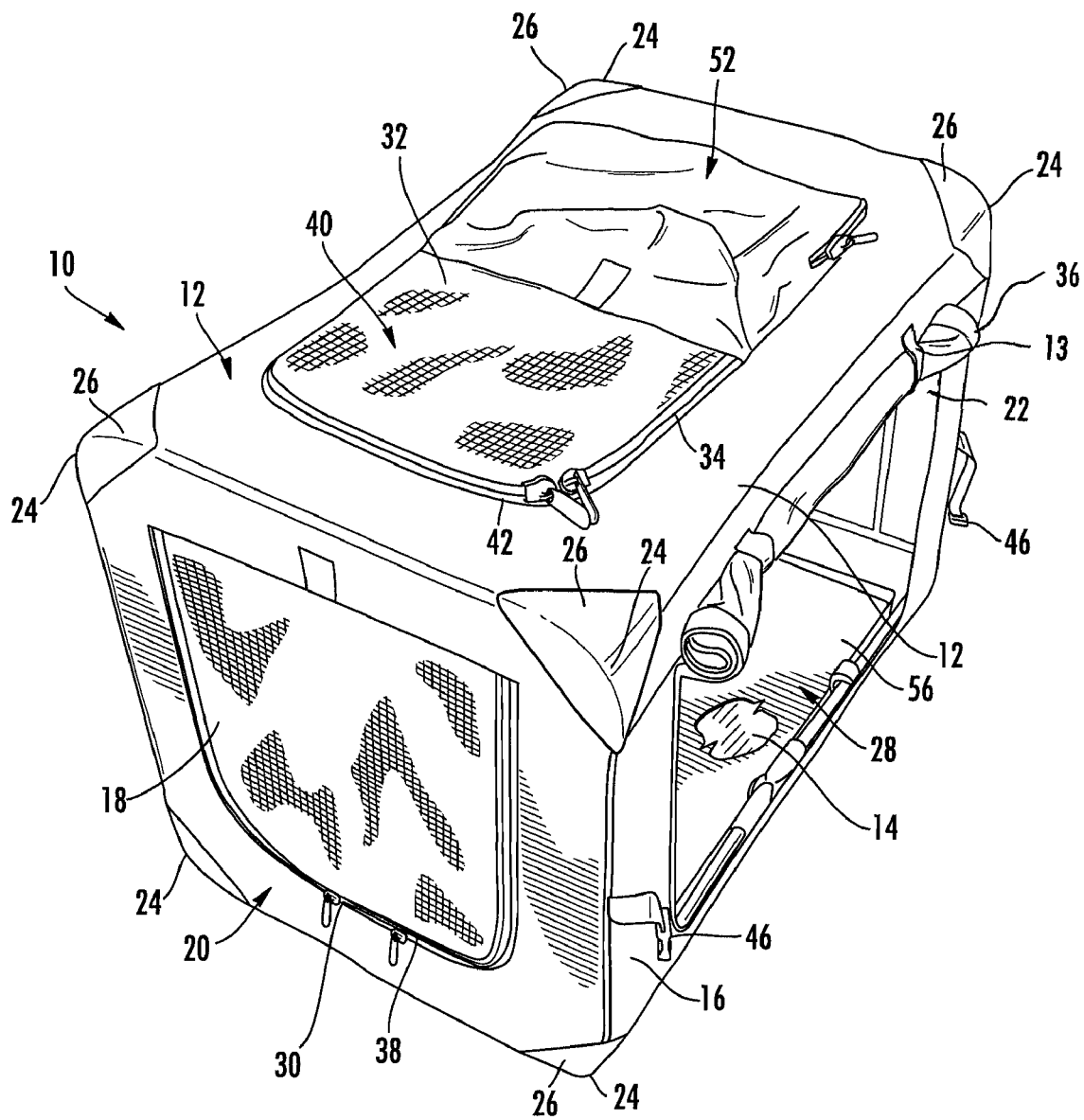
FIG. 1 is a front perspective view of a preferred embodiment of the collapsible soft pet crate of the present invention in the expanded position.

As shown in FIG. 1, the corners 24 are rounded and reinforced by corner pads 26. Rounded corners 24 and corner pads 26 reduce the chance that the collapsible soft pet crate 10 will damage objects that it comes in contact with such as the interior of an automobile, furniture, etc. The corner pads 26 also keep the corners 24 from fraying and hold the panels more securely together. Preferably, the corner pads 26 are made of a strong fabric that is not likely to damage objects that the collapsible soft pet crate 10 comes into contact with. Such fabric may include leather, canvas, twill, etc.

Figure 3:
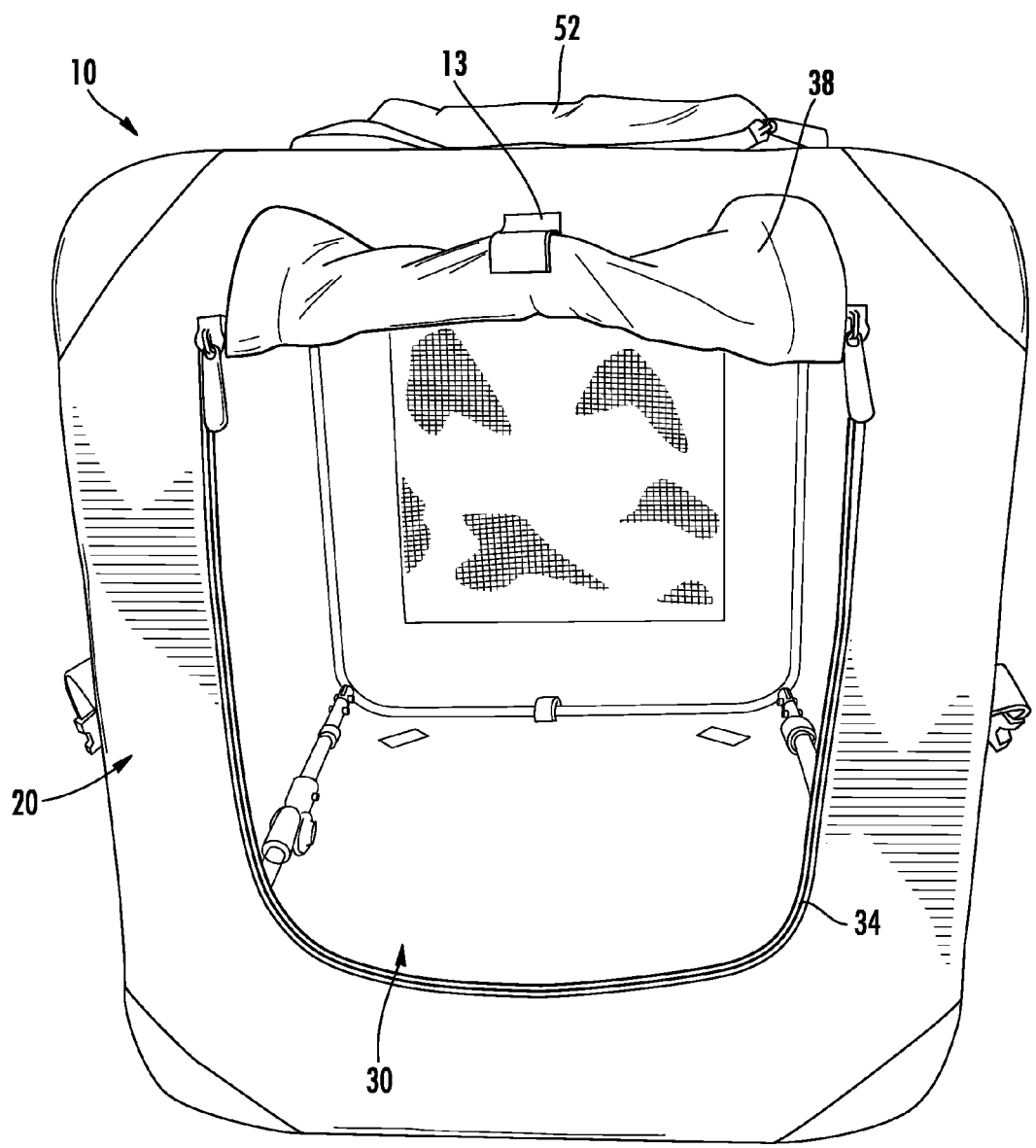
FIG. 3 is a left-side view of the embodiment of the collapsible soft pet crate shown in FIG. 1 with the left-panel opening open.

As shown in FIGS. 1 and 2, the front panel 16 has a front opening 28. As shown in FIGS. 1 and 3, the left-side panel 20 has a left-panel opening 30 and, as shown in detail in FIG. 4, the top panel 12 has a top opening 32. In other embodiments, the back 18, bottom 14, and right-side 22 panels may also or alternatively contain openings.

As shown in FIG. 1, the front opening 28 is larger than the left-panel opening 30 and the top opening 32, however, in other embodiments, in particular, where the collapsible soft pet crate 10 is not rectangular, the reverse may be true. In other embodiments, the openings 28, 30, 32 are the same size. The front panel opening 28, left panel opening 30 and top panel opening 32 are sized to accommodate at least the largest-sized pet that the particular collapsible soft pet crate 10 is designed for. For example, for a "small" sized collapsible soft pet crate 10, these openings 28, 30, 32 are large enough to allow at least a thirty-pound pet to pass through. Preferably, the front panel opening 28, top panel opening 32 and left-panel opening 30 are surrounded by zipper teeth 34 on at least three sides.

Figure 4:
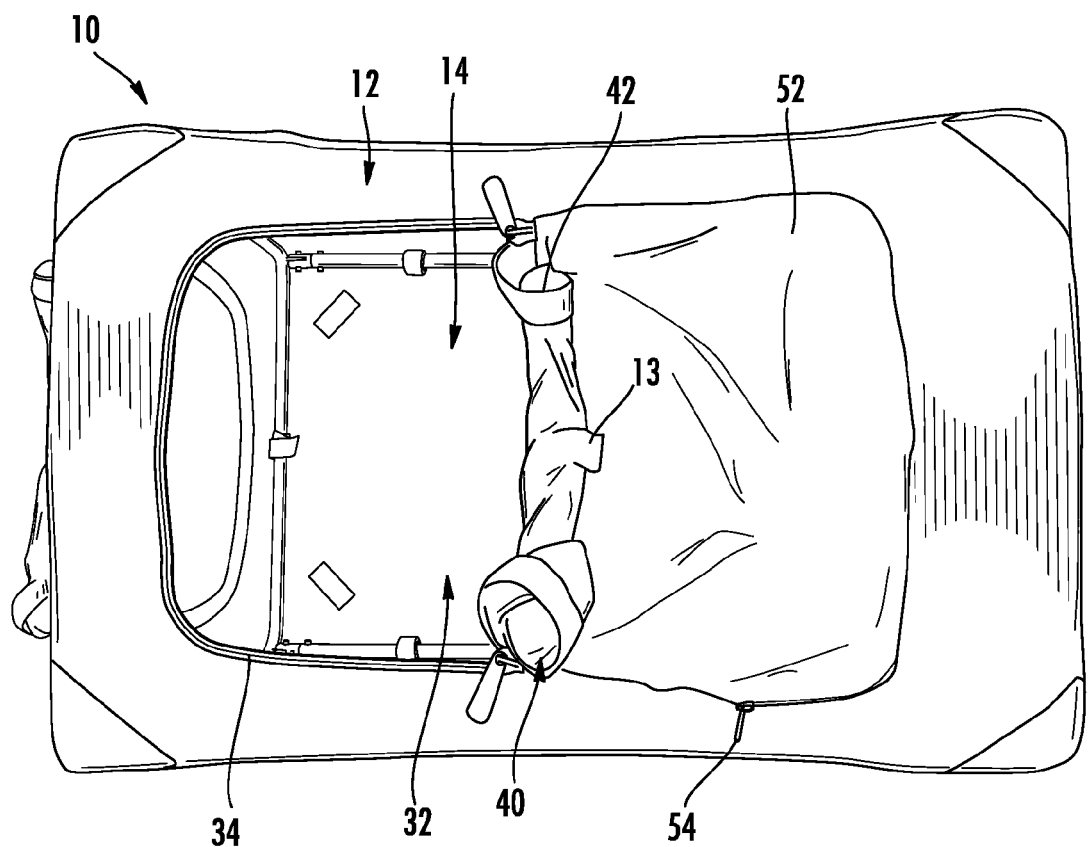
FIG. 4 is a top view the embodiment of the collapsible soft pet crate shown in FIG. 1 with the top panel opening open.

As shown in FIGS. 1-3, flaps 36, 38, 40 are located above the front opening 28 and the left-panel opening 30. As shown in FIGS. 1-2, a front opening flap 36 is attached over the front opening 28. As shown in FIG. 3 a side-opening flap 38 is attached over the left-panel opening 30. As shown in FIG. 4, a top-opening flap 40 is attached to the right of the top opening 32.

As shown in FIGS. 1-3, the front opening flap 36 and side opening flap 38 can be rolled-up toward the top panel 12 and locked thereon via hook and loop fasteners, such as VELCRO® clips 13, other clips, buttons, etc. to keep the front opening 28 and left-panel opening 30 opened. As shown in FIG. 4, the top-opening flap 40 can be rolled-up on the right-side of the top opening 32. These flaps 36, 38, 40 may be comprised of soft, breathable, durable, flexible and preferably, machine washable material that cannot be damaged by a pet by scratching, chewing, etc. Such materials may include plastic, polyester, nylon, such as woven nylon 6-6 fabric sold under the trade name CORDURA®, canvas, twill, vinyl, leather, cotton, etc. In the preferred embodiment, the flaps 36, 38, 40 are comprised of a soft yet durable nylon mesh fabric. Preferably, the flaps 36, 38, 40 are surrounded by zipper teeth 42 that are engageable with the zipper teeth 34 surrounding the openings 28, 30, 32 that the respective flaps 36, 38, 40 are adjacent to.

Figure 5:
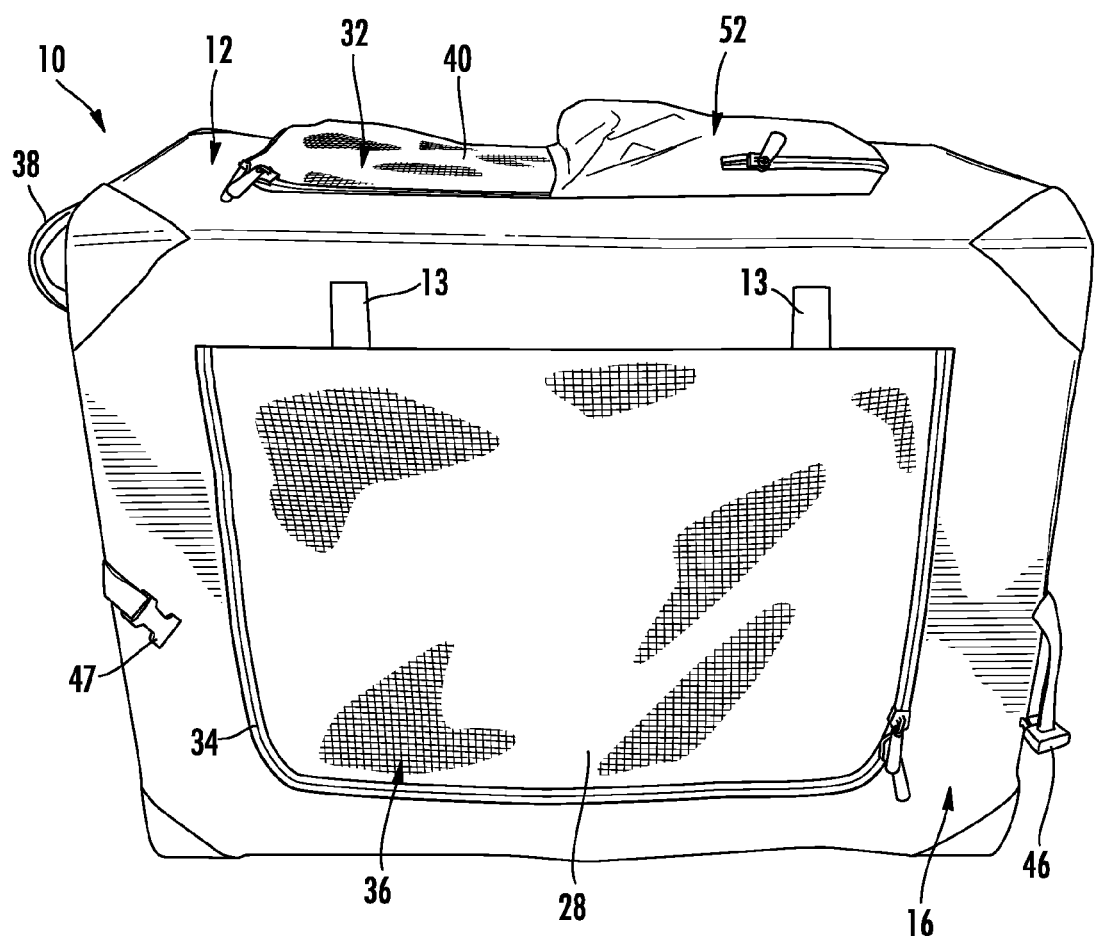
FIG. 5 is a front perspective view of the embodiment of the collapsible soft pet crate shown in FIG. 1 with the front panel opening closed.
Figure 6:
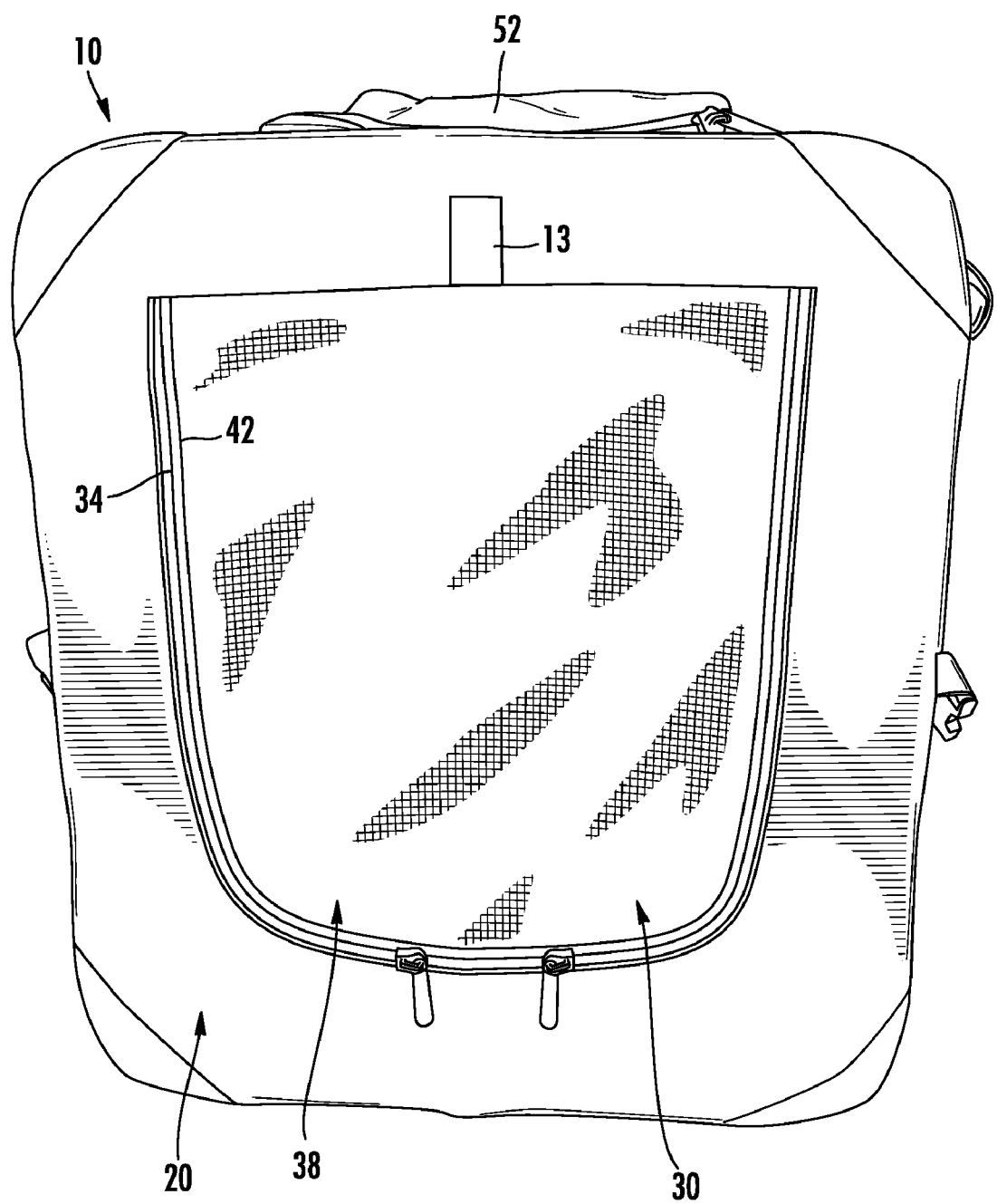
FIG. 6 is a left-side view of the embodiment of the collapsible soft pet crate shown in FIG. 1 with the left-panel opening closed.
Figure 7:
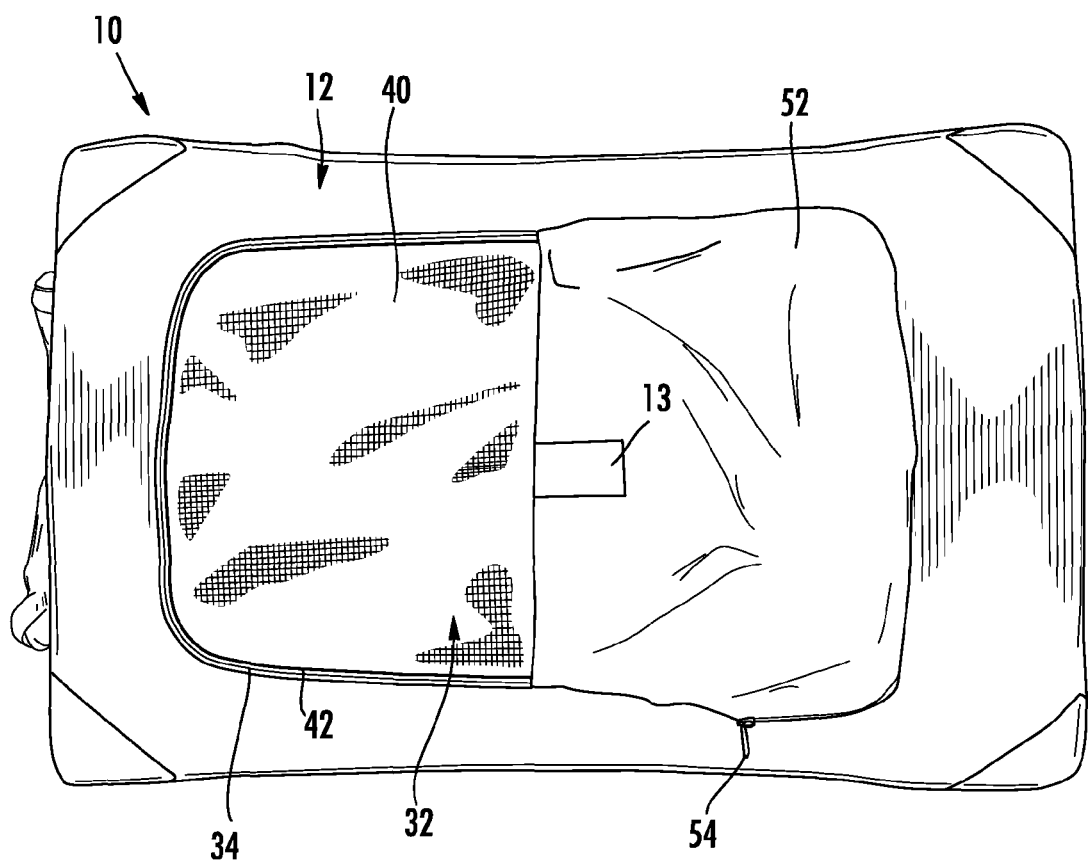
FIG. 7 is a top view of the embodiment of the collapsible soft pet crate shown in FIG. 1 with the top panel opening closed.

The flaps 36, 38, 40 are sized and shaped to fit within the respective openings 28, 30, 32 that the flaps 36, 38, 40 are adjacent to or above. To close any of the aforementioned openings, the user (not shown) simply unlocks the hook and loop fasteners, such as VELCRO® clips 13, rolls the flaps 36, 38, 40 downward, upward, rightward or leftward depending on the configuration, and secures the flap 36, 38, 40 to its corresponding opening 28, 30, 32, preferably by zippering around the perimeter of the flap. As shown in FIGS. 5-7, closing the flaps 36, 38, 40 closes the openings 28, 30, 32. One of skill in the art will recognize that other means may be used to secure the flaps 36, 38, 40 to the openings 28, 30, 32 as long as those means do not allow a pet to open the openings. For example, in other embodiments, the flaps may fit over the openings and be secured by hook and loop fasteners, such as VELCRO® clips, buttons, etc. One of skill in the art will recognize that the flaps 36, 38, 40 can be attached to other portions of the collapsible soft pet crate 10 or that the flaps 36, 38, 40 can be separate portions attachable to the collapsible soft pet crate 10.

Figure 8:
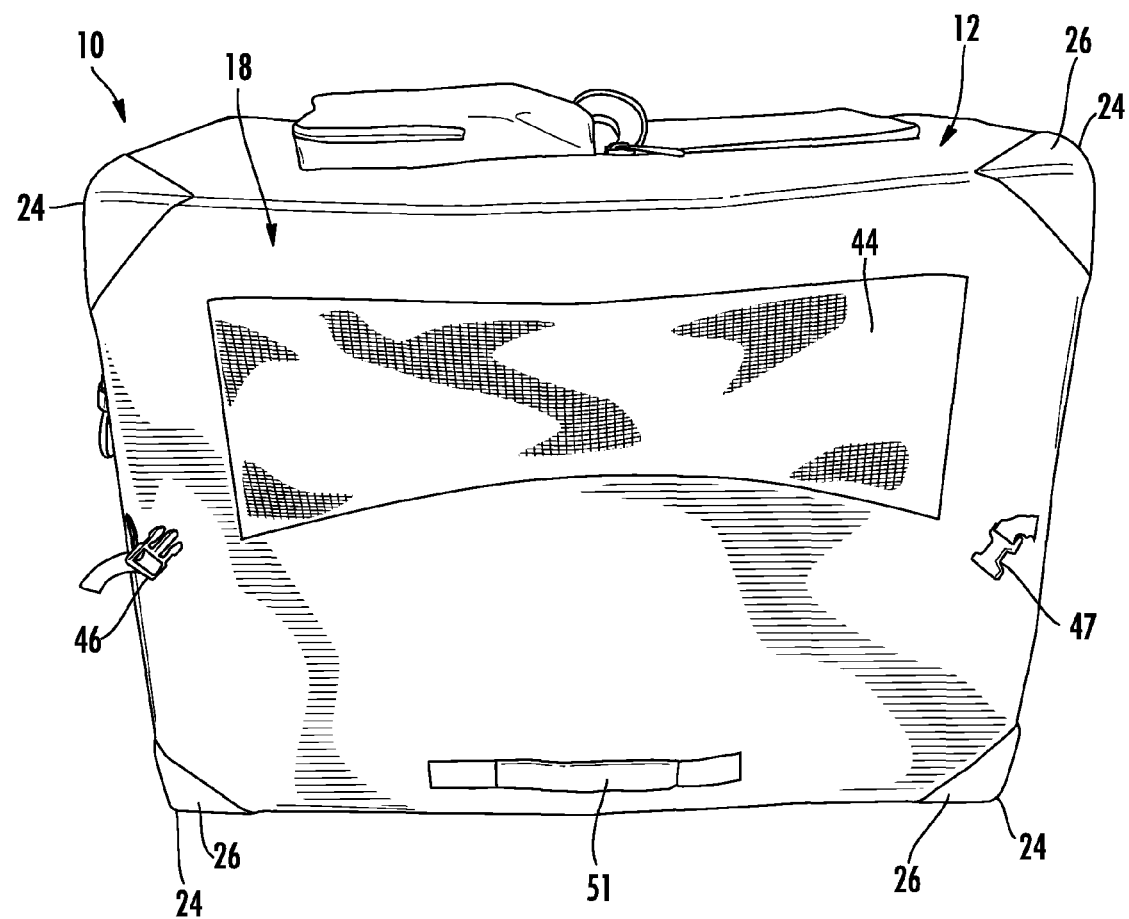
FIG. 8 is a rear perspective view the embodiment of the collapsible soft pet crate shown in FIG. 1.
Figure 9:
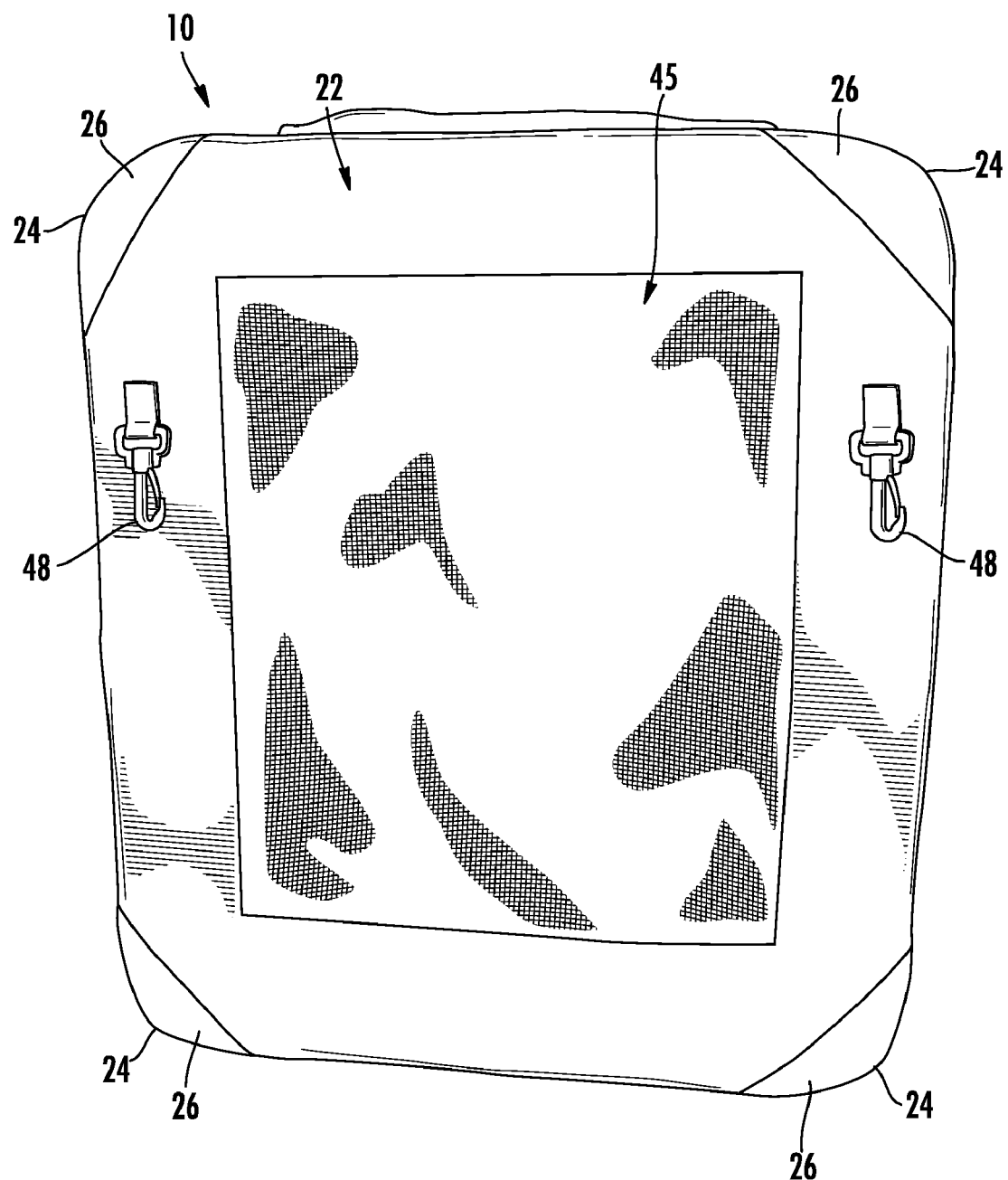
FIG. 9 is a right-side view of the embodiment of the collapsible soft pet crate shown in FIG. 1.

As shown in FIGS. 8 and 9, the back panel 18 and right-side panel 22 have back 44 and side 45 mesh portions. These portions 44, 45 may be comprised of any breathable, durable, flexible and preferably, machine washable material that cannot be damaged by a pet by scratching, chewing, etc. Such materials may include plastic mesh, woven nylon 6-6 fabric, such as that sold under the trade name CORDURA®, polyester, nylon, canvas, twill, vinyl, leather, cotton, etc. In the preferred embodiment, the mesh portions 44, 45 are comprised of the same soft, durable nylon mesh fabric as used for the flaps 36, 38, 40. Unlike the left side panel opening 30, top opening 32 and front opening 28; however, these mesh portions 44, 45 are preferably sewn into position and are not removable. These portions 44, 45 may be any size or shape that permits air circulation within the collapsible soft pet crate 10 and easy viewing of the pet inside. In another embodiment, there are not any mesh portions.

Figure 10:
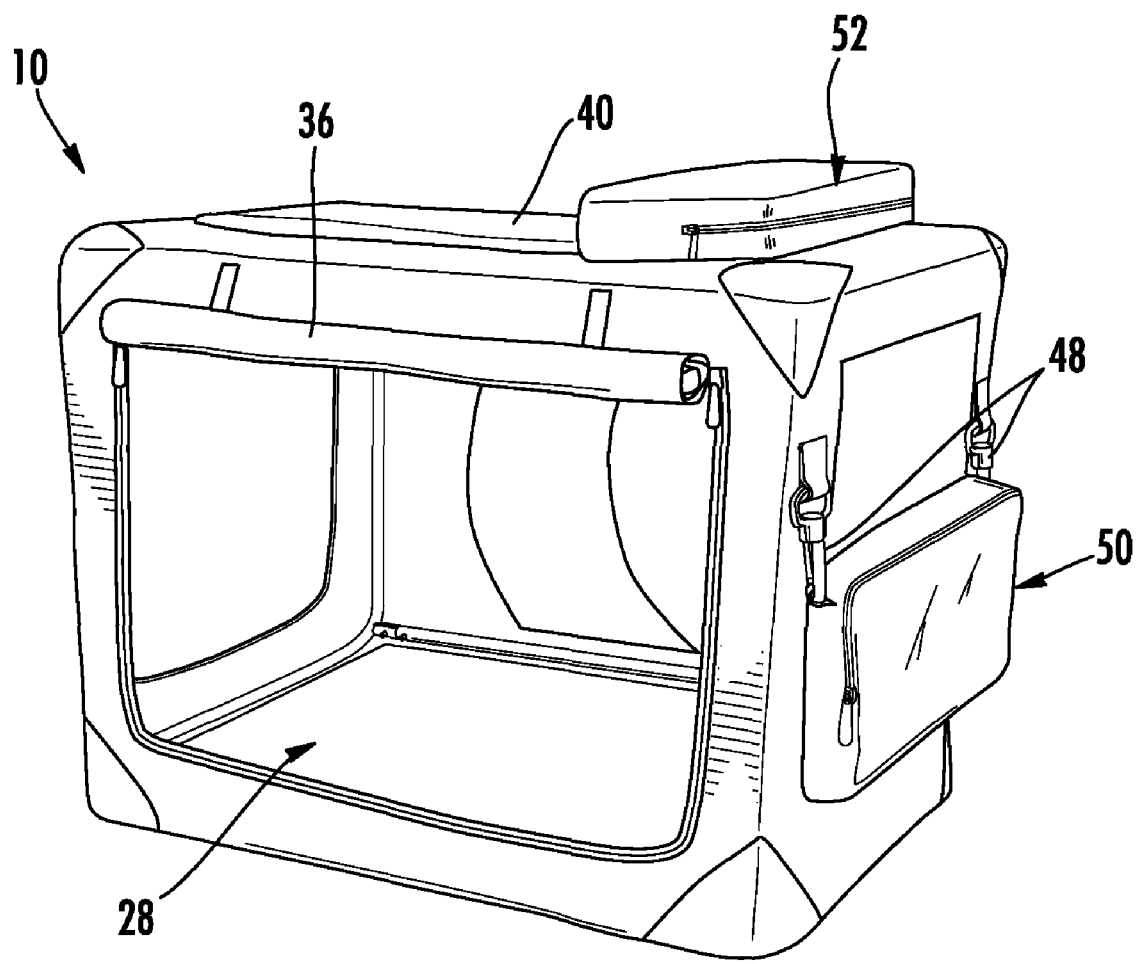
FIG. 10 is a perspective view of the collapsible soft pet crate with the optional storage bag attached.

Also shown in FIGS. 2, 5 and 8, side-squeeze clips 46 and side-squeeze clip receivers 47 are secured to the front panel 16, back panel 18 and left-side panel 20. The clips 46 and receivers 47 allow the collapsible soft pet crate 10 to be secured in place; for example, in a vehicle or to an object in the home. One of skill in the art will understand that other configurations may be used to allow one to easily secure the collapsible soft pet crate 10 to various objects. As shown in FIG. 9, squeezable hook clips 48 may be secured to the right-side panel 22. These clips 48 hold a removable side bag 50, which is shown in FIG. 10. Optionally, clips (not shown) may be attached to one of the panels to allow a user to attach a strap for easy carrying. As shown in FIG. 8, a handle 51 is attached to the back panel 18, which also allows for easy carrying.

As shown in FIGS. 1, 2, 4 and 5, the collapsible soft pet crate 10 also has a top storage bag 52. As shown in detail in FIGS. 1 and 4, preferably, the top storage bag 52 is formed as part of the top panel 12. The top storage bag 52 is preferably opened and closed via a zipper 54, and could also be opened and closed using other similar connectors, such as buttons, snaps, or hook and loop fasteners, such as VELCRO® textile fastening straps. The top storage bag 52 is sized to accommodate the removable floor mat (not shown) or tray 56, pet food, toys, etc.

The collapsible soft pet crate has a removable tray 56, shown in FIG. 1, and preferably a floor mat (not shown). The removable tray 56 is rectangular and sized to fit within and cover the entire bottom panel of the collapsible soft pet crate 10 and preferably, fit under the removable floor mat. It can be foldable to a smaller size via one or more fold lines. The removable tray 56 is comprised of a rugged material and one likely to resist stain and corrosion from pet urine, feces or vomit. Suitable materials are preferably waterproof and easily cleaned and include rubber, nylon, plastic, polyester, Micro Suede, GoreTex® or other materials with a micro porous Teflon® membrane. The removable tray can be secured to the bottom panel by hook and loop fasteners, such as VELCRO®, or zippering, clips, buttons, etc.

The removable floor mat is rectangular and also sized to fit within and cover the entire bottom panel of the collapsible soft pet crate. The removable floor mat is preferably comprised of a machine washable, soft, comfortable, yet durable material such as fleece, cotton, nylon, polyester, woven nylon 6-6 fabric, such as that sold under the trade name COR-DURA®, twill, leather, etc. and may be stuffed with feathers, a polyfill material, down, polyester, etc. The removable floor mat can be secured to the bottom panel or the removable tray by hook and loop fasteners, such as VELCRO®, as well as, zippering, clips, buttons, etc., so it can be removed for easy cleaning.

As shown in FIGS. 1, 3, 11, 12 and 17-19, the cover of the collapsible soft pet crate 10 is supported by a frame 60. In the preferred embodiment, the frame 60 is comprised of a top portion 62, a bottom portion 68, a left-side portion 74 and a right-side portion 76. In other embodiments the frame 60 may be comprised of more or less portions. In the preferred embodiment, these portions are comprised of steel tubing. But they may be comprised of any durable, strong, rigid material such as plastic.

Figure 12:
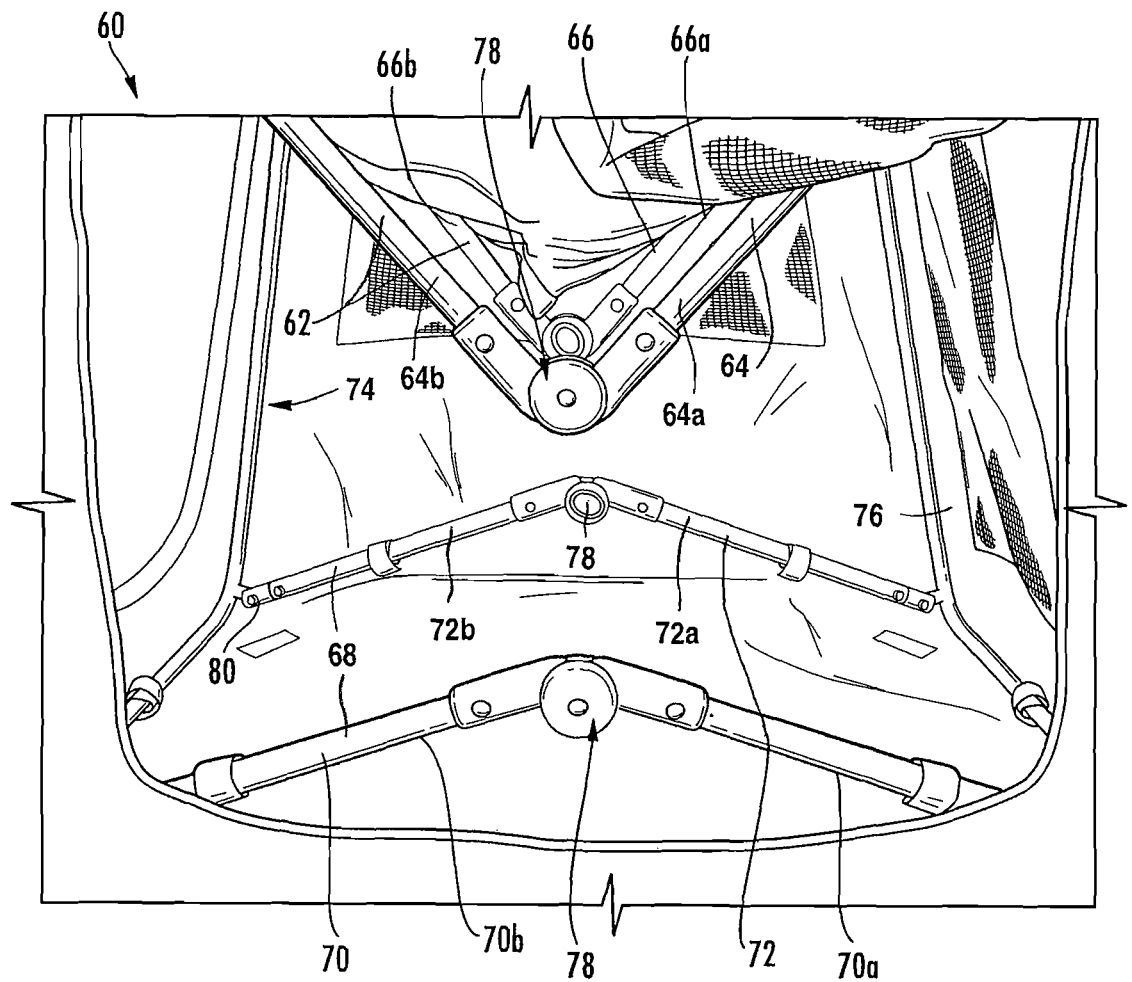
FIG. 12 is an internal perspective view looking in the front opening of the frame of the collapsible soft pet crate shown in FIG. 1 wherein the frame is partially collapsed.

As shown in FIG. 12, the top portion 62 is further comprised of a first top member 64 and a second top member 66. The bottom portion 68 is further comprised of a first bottom member 70 and a second bottom member 72. The first top member 64 includes a first segment 64a and a second segment 64b. The second top member also includes a first segment 66a and a second segment 66b. The first bottom member 70 includes a first segment 70a and a second segment 70b. And, the second bottom member 72 also includes a first segment 72a and a second segment 72b. For each of these members, the respective first and second segments, 64a,b; 66a,b; 70a,b and 72a,b are connected to each other via a first hinge 78, which is shown in detail in FIG. 13. In the preferred embodiment, there are two segments and one first hinge along each top and bottom member but in other embodiments, more segments and hinges may be used. These first hinges 78 are preferably plastic but may be comprised of any suitable material. Each first and second segment is connected to the left and right side portions 74, 76 via second hinges 80, which are shown in detail in FIG. 14.

Figure 17:
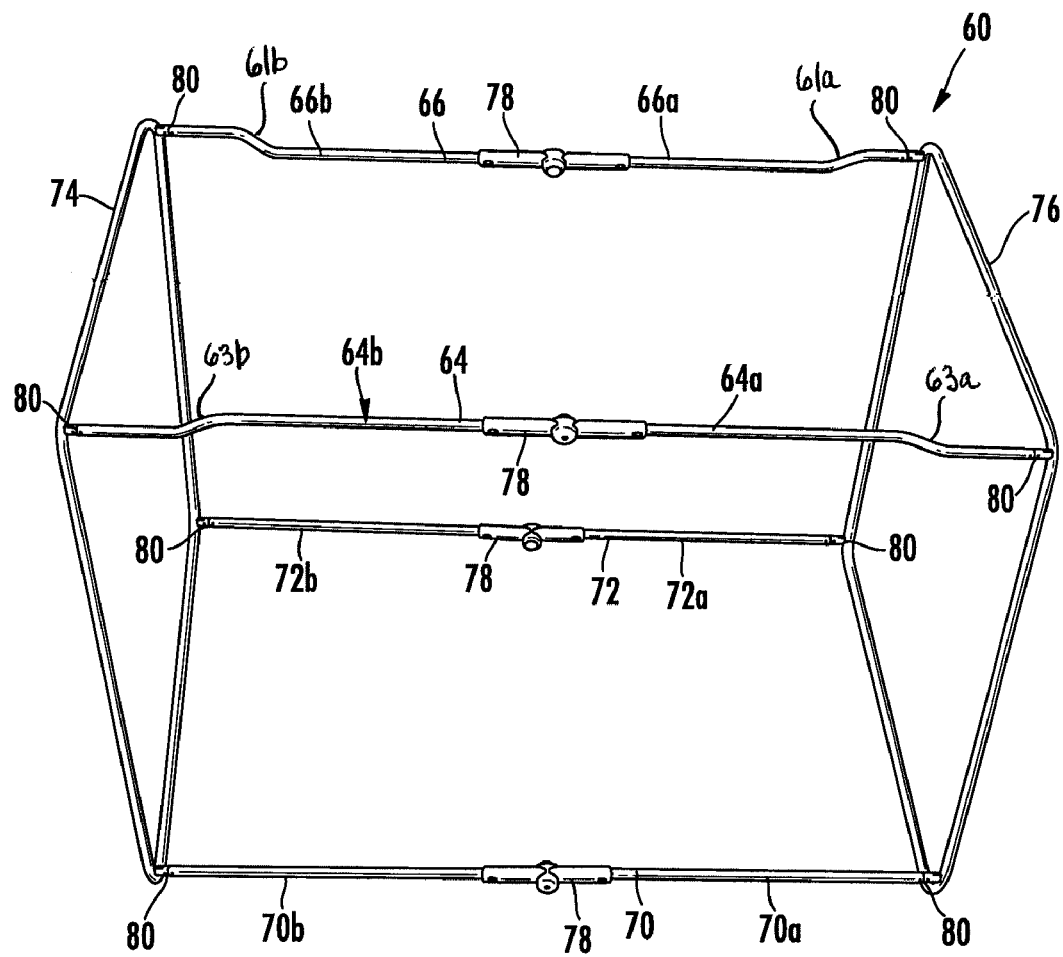
FIG. 17 is a perspective view of the pet crate of FIG. 1, without the cover, shown fully open.
Figure 18:
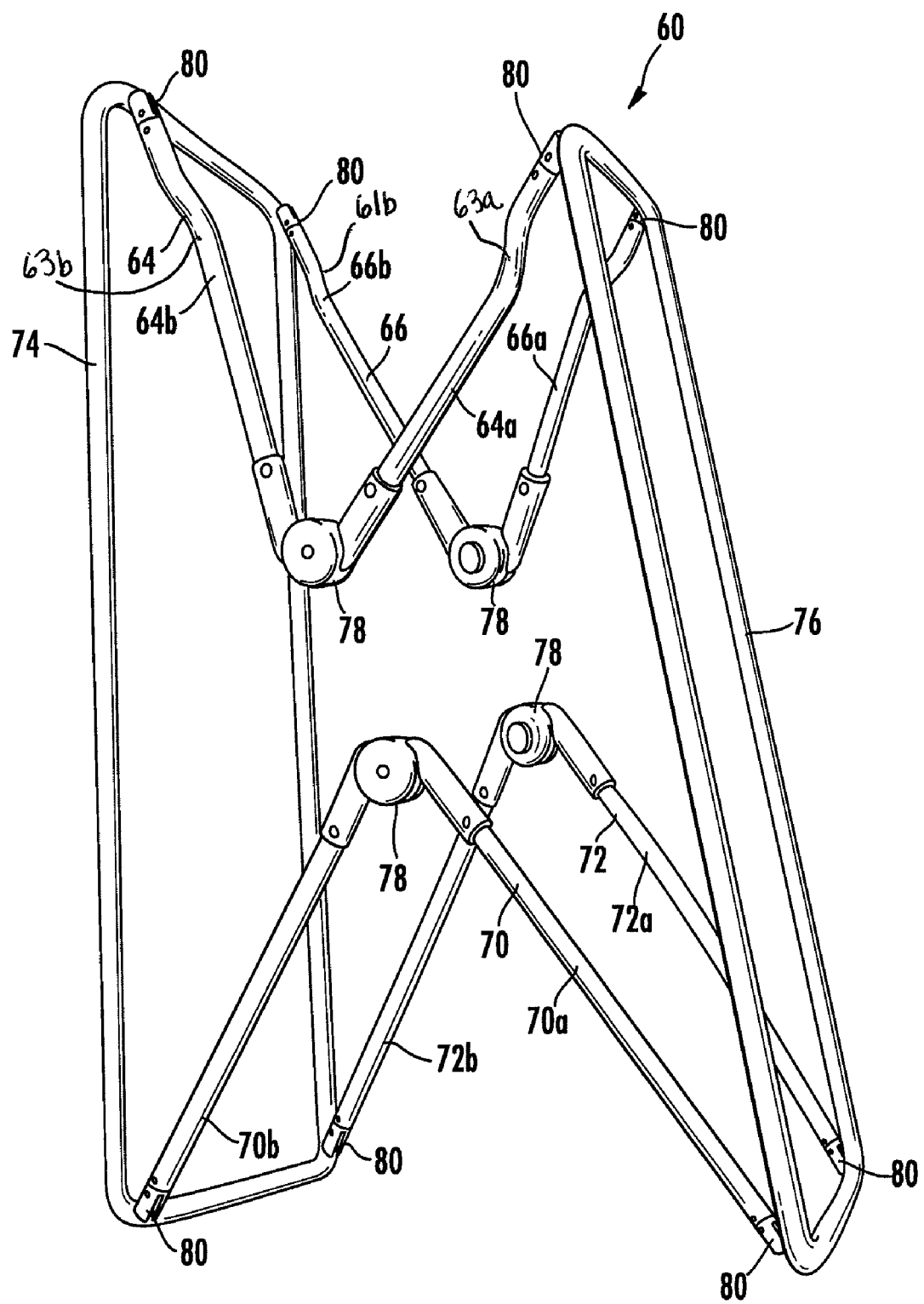
FIG. 18 is a perspective view of the pet crate of FIG. 17, without the cover, shown partially collapsed.
Figure 19:
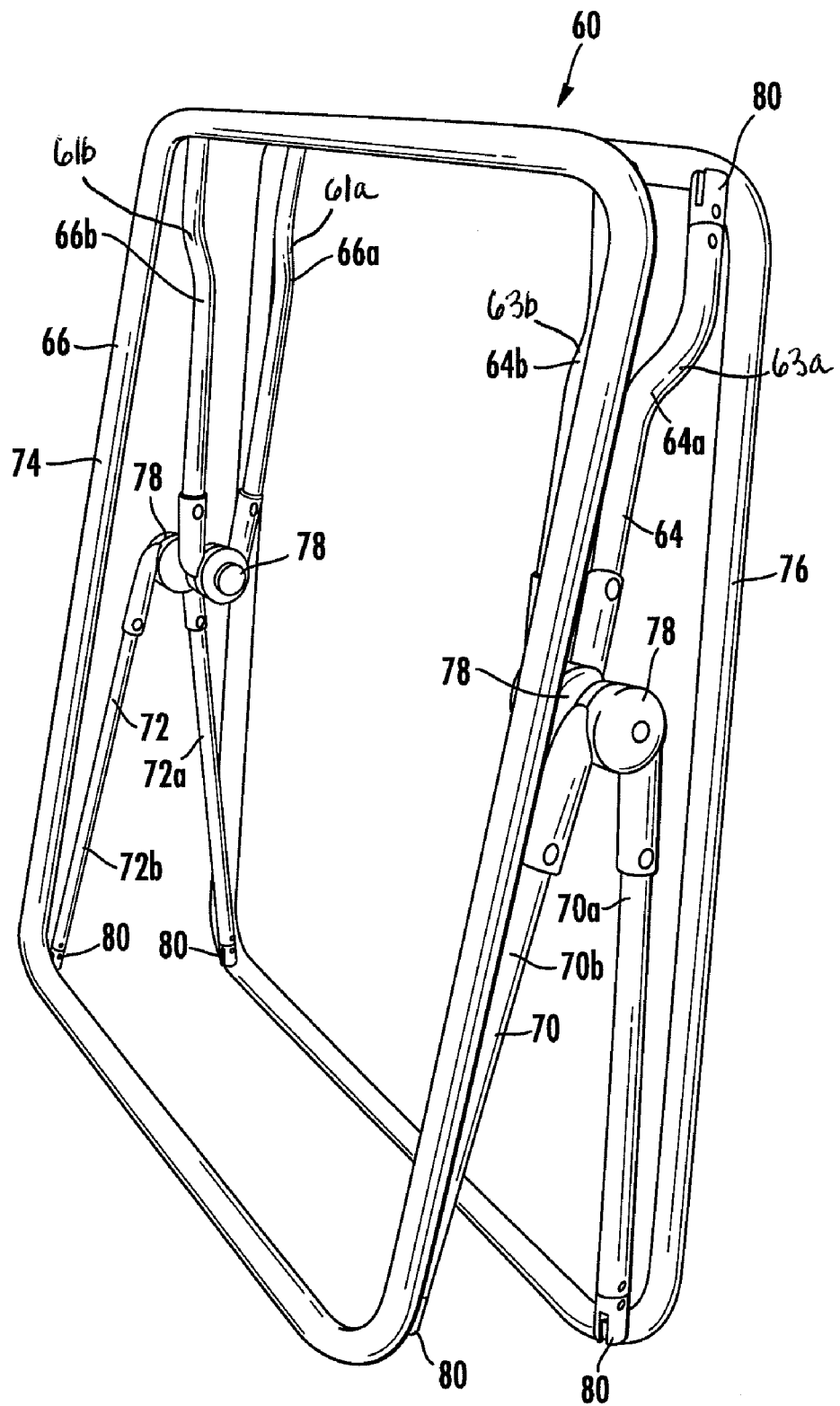
FIG. 19 is a perspective view of the pet crate of FIG. 17, without the cover, shown in the fully collapsed or second position.

As shown in FIGS. 17-19, the top members 64, 66 each include two aligned end portions 65a,b; 67a,b located in common planes with the bottom members 70, 72. Center portions 69, 71 are located between each pair of end portions 65a,b; 67a,b and are laterally displaced inwardly with respect to the planes of the end portions 65a,b; 67a,b and the bottom members 70, 72. The center portions 69, 71 extend longitudinally in a direction parallel with the planes of the end portions 65a,b; 67a,b and the bottom member 70, 72. The center portions 69, 71 include the first hinges 78, so that the first hinges 78 of the top members 64, 66 are laterally displaced inwardly with respect to the first hinges 78 of the bottom members 70, 72, while the second hinges 80 of the top members 64, 66 are located above the second hinges 80 of the bottom members 64, 66. In particular, as shown in FIGS. 17-19, the first and second segments 64a,b and 66a,b include transitional portions 61a,b and 63a,b that connect the end portions 65a,b; 67a,b with the center portions 69, 71 of each top member 70, 72. The transitional portions 61a,b; 63a,b are angled with respect to the bottom members 70, 72 and extend inwards towards one another. This results in the first hinges 78 of the top members 64, 66 being disposed inward of the first hinges 78 of the bottom members 70, 72 as well as with respect to the second hinges 80 of the top and bottom members 64, 66, 70, 72.

Because there is at least one foldable member for each of the top 62 and bottom 68 portions, the top 12 and bottom 14 panels are both collapsible. In other words, there are no solid panels, as in the prior art. This allows the present invention to collapse further than the prior art soft crates.

Figure 11:
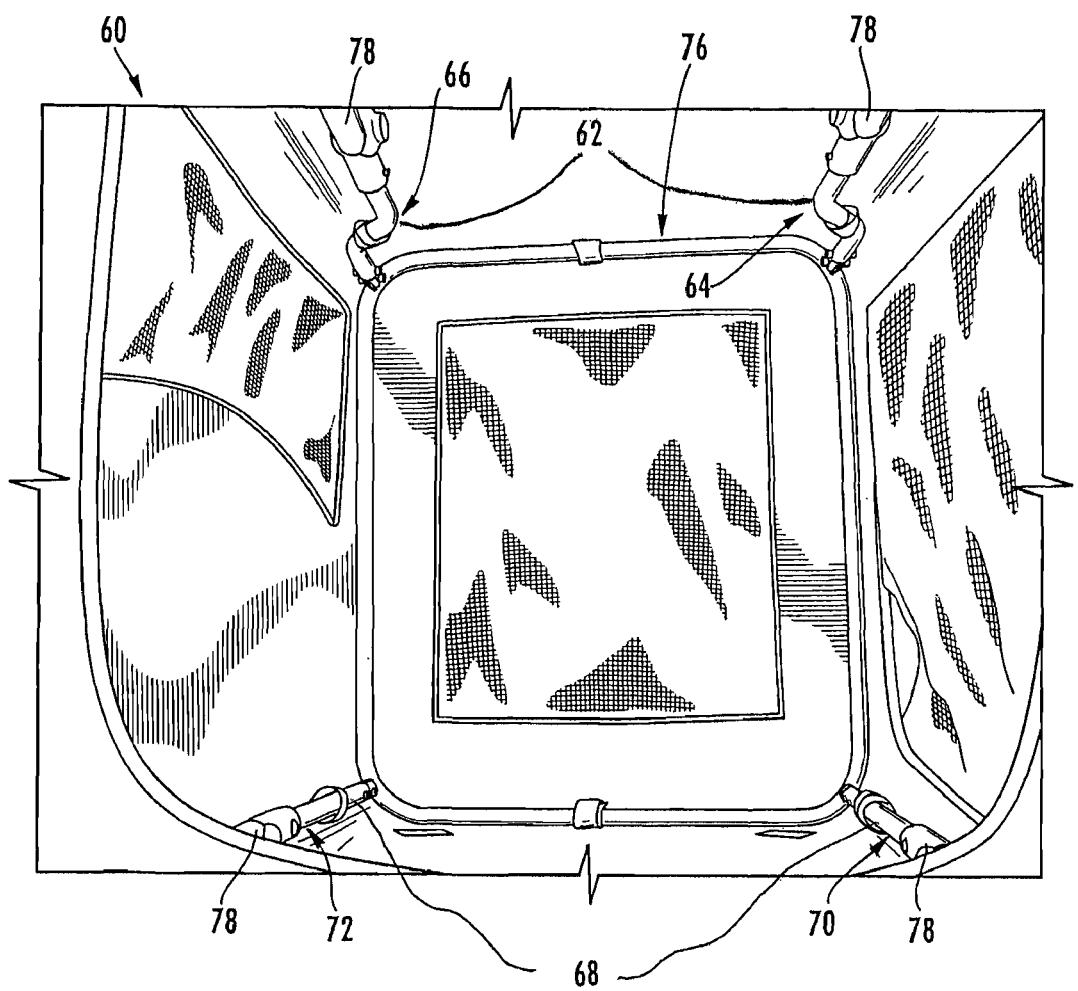
FIG. 11 is an internal perspective view looking at the right-side portion of the frame of the collapsible soft pet crate shown in FIG. 1.

As shown in FIG. 11, the left and right side portions 74, 76 are preferably formed of a continuous piece of steel tubing having a substantially rectangular shape with rounded corners. One of skill in the art would understand that in other embodiments, the left and right-side frames may also be hinged, and can have another shape.

Figure 13:
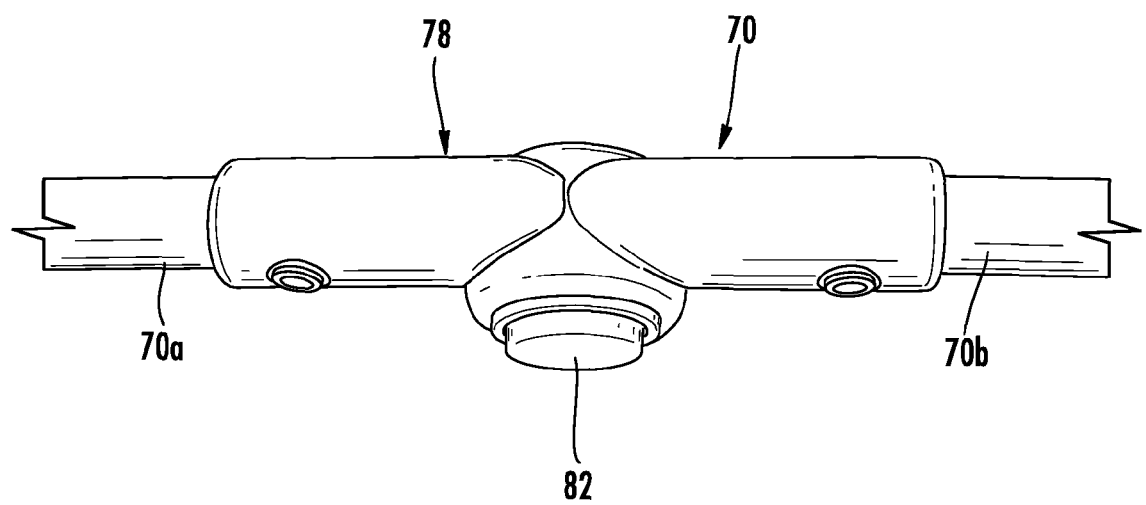
FIG. 13 is a perspective view of a first hinge located on a member of the bottom portion or the top portion of the frame of the collapsible soft pet crate shown in FIG. 1.
Figure 14:
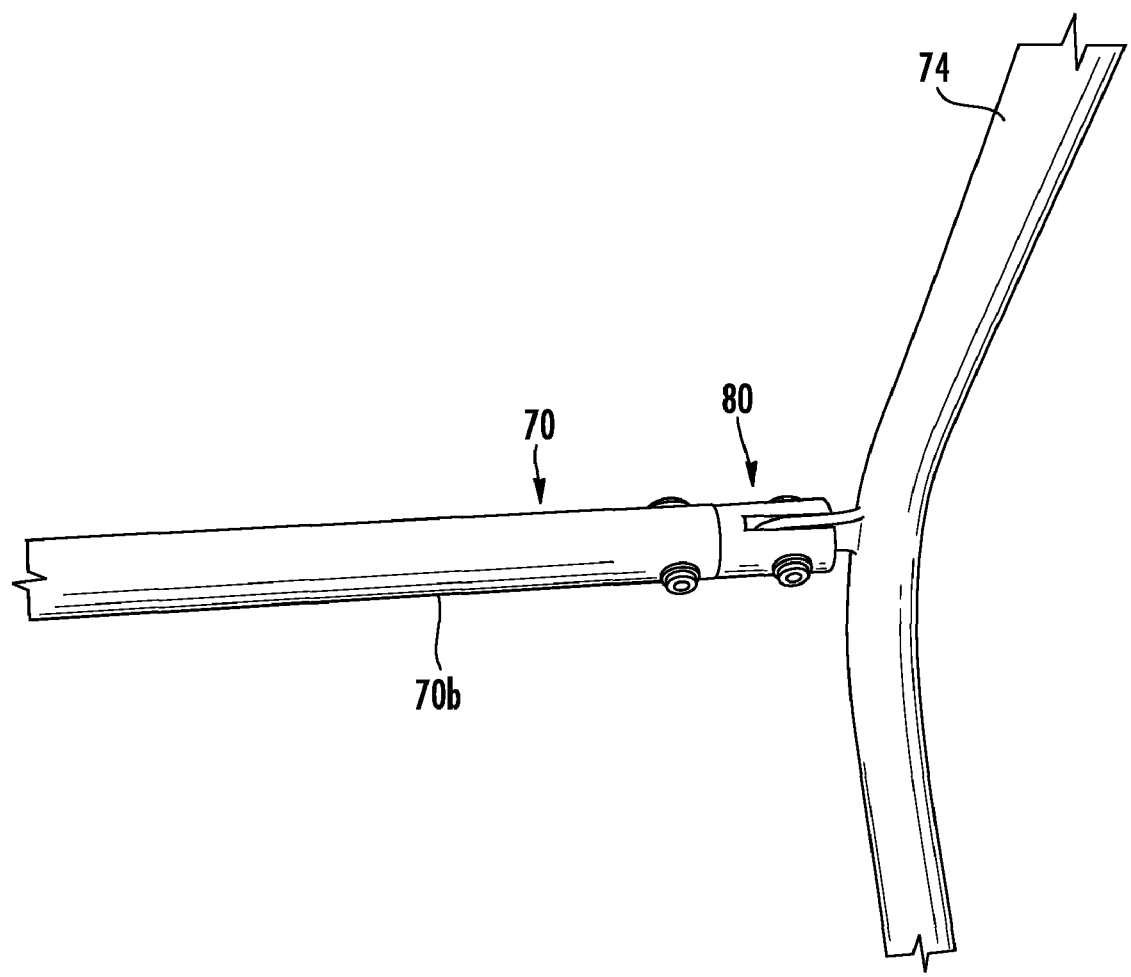
FIG. 14 is a perspective view of a second hinge connecting a member of the bottom portion or the top portion of the frame to a side portion of the frame of the collapsible soft pet crate shown in FIG. 1.
Figure 15:
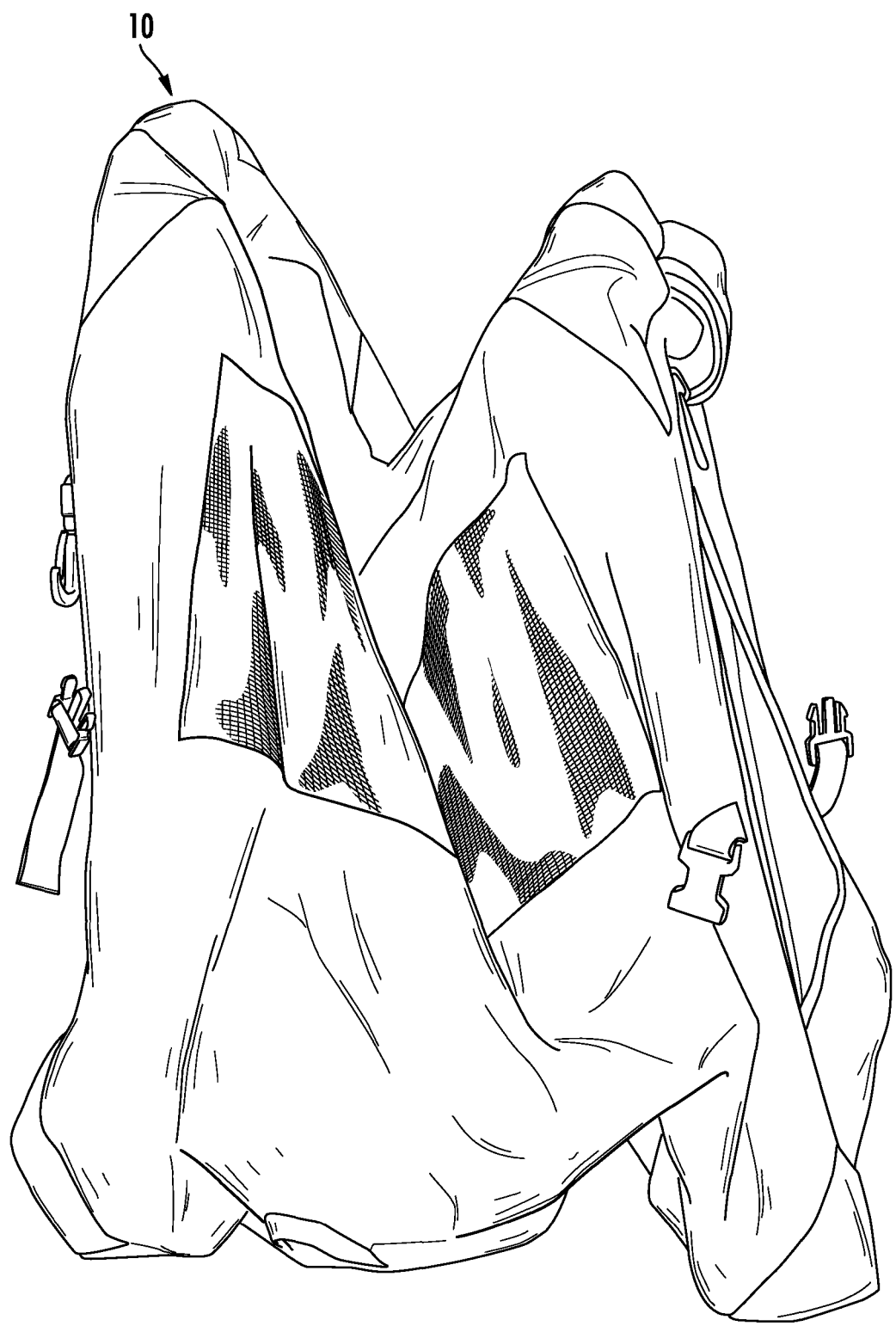
FIG. 15 is a rear perspective view of the collapsible soft pet crate shown in FIG. 1 partially collapsed.
Figure 16:
FIG. 16 is a rear perspective view of the collapsible soft pet crate shown in FIG. 1 in the collapsed or second position.

The first hinges 78 are locked when the collapsible soft pet crate 10 is in the expanded position (shown in FIGS. 1 and 17) and can unlock by the user pressing a button 82 on the first hinge (shown in detail in FIG. 13). As shown in FIGS. 12 and 18, to fold the collapsible soft pet crate 10 into a second position, after pressing the button 82, the user folds the first hinges 78 along the first 70 and second 72 bottom members upward and folds the first hinges 78 along the first 64 and second 66 top members downward. This causes the top 62 and bottom 68 portions along with the cover to collapse and the left 20 and right 22 side panels to move toward each other, as shown in FIGS. 12, 15 and 18. The user presses the left and right side members 74, 76 toward each other until the collapsible soft pet crate 10 reaches the second or folded position, which is shown in FIGS. 16 and 19. As shown in FIG. 19, the inward positioning of the first hinges 78 of the top members 64, 66 with respect to those of bottom members 70, 72, prevents interference between these portions during folding, permitting the members 64, 66, 70, 72 to fold into a nested configuration, in which the first hinges 78 of top members 64, 66 are disposed adjacent to and between the first hinges 78 of bottom members 70, 72. This allows left and right side members 74, 76 to be moved closer together, providing the crate 10 with a more compact collapsed configuration.

Folding the collapsible soft pet crate 10 from the expanded position makes the collapsible soft pet crate 10 more compact and easier to transport and store. Because the collapsible soft pet crate 10 does not have a rigid base, it is capable of folding more compactly than the collapsible soft pet crates in the prior art. Further, the front, side and top openings allow entry into the collapsible soft pet crate 10 from multiple points allowing a pet to easily move in and out of the collapsible soft pet crate 10 when the flaps are open unlike the collapsible soft pet crates in the prior art.

In addition, in another embodiment (not shown) the collapsible soft pet crate 10 may be comprised of accessories such as a partition fittable within the area in which the pet sits. The partition allows a user to separate this area, making the collapsible soft pet crate 10 usable for multiple pets.

The collapsible soft pet crate 10 can be made in different sizes to house different sized pets. A "small" sized collapsible soft pet crate 10 may be 26.5"L×18"W ×21"H to house a pet up to 30 lbs. A "medium" sized collapsible soft pet crate 10 may be 36"L×24"W×27"H to house a pet up to 70 lbs. A "large" sized collapsible soft pet crate 10 may be 42"L× 29"W×28"H to house a pet up to 90 lbs. These are preferred dimensions but one of skill in the art would recognize that the collapsible soft pet crate 10 may be made with different dimensions.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A collapsible soft crate, comprising:
   a frame including:
      two top members;
      two bottom members;
      at least two side members;
      the two top members and the two bottom members each including a first hinge along a length thereof;
      the two top members and the two bottom members each being connected via second hinges to the at least two side members;
   at least four flexible panels directly connected to each other and surrounding a portion of the frame;
   the two top members and the two bottom members being movable from a first, extended position, wherein the at least two side members are spaced apart from one another by a length of the top and the bottom members, to a second, collapsed position, wherein the hinges are folded, the at least two side members are moved into proximity with one another, and the first hinges of the top members are located between the first hinges of the bottom members; and wherein the two top members are generally located above respective ones of the two bottom members, the second hinges of the top members are located above respective ones of the second hinges bottom members, and the first hinges of the top members are laterally displaced inwardly with respect to the first hinges of the bottom members.

2. The collapsible soft crate of claim 1, further comprising at least one opening in at least one of the at least four panels.

3. The collapsible soft crate of claim 2, wherein the at least one opening comprises openings in a front panel, a side panel, and a top panel.

4. The collapsible soft crate of claim 2, further comprising at least one flap shaped to fit over the at least one opening.

5. The collapsible soft crate of claim 1, wherein the hinges are located at a generally medial location in the at least one top member and the at least one bottom member, creating first and second top member segments and first and second bottom member segments.

6. The collapsible soft crate of claim 5, wherein in the second collapsed position, the first and second top member segments extend downwardly, generally parallel to the side members, and the first and second bottom member segments extend upwardly, generally parallel to the side members.

7. The collapsible soft crate of claim 1, wherein in the first extended and second collapsed position, the side members remain generally parallel to one another.

8. The collapsible soft crate of claim 1, wherein the panels are directly connected to each other by stitched thread.

9. The collapsible soft crate of claim 1, further comprising a plurality of corner pads disposed at corners of the frame.

10. The collapsible soft crate of claim 1, further comprising at least one storage bag attached to at least one of the panels.

11. The collapsible soft crate of claim 1, further comprising a handle attached to at least one of the panels.

12. The collapsible soft crate of claim 1, wherein each of the top members includes an offset portion that laterally displaces the first hinge.

13. A collapsible soft crate, comprising:
   a frame including:
      a top member;
      a bottom member;
      two side members;
      the top member and the bottom member each including a first hinge along a length thereof;
      the top member and the bottom member each being connected via second hinges to the two side members;
      the top member including two aligned end portions located in a same plane with the bottom member and a center portion including the first hinge, the center portion being laterally displaced with respect to and extending longitudinally in a direction parallel with the plane of the end portions and the bottom member;
   a fabric cover surrounding a portion of the frame;
   the frame being movable from a first, extended position, wherein the side members are spaced apart from one another by a length of the top and the bottom members, to a second, collapsed position, wherein the hinges are folded, the two side members are moved into proximity with one another, and the center portion of the top member is adjacent to the bottom member.

14. The collapsible soft crate of claim 13, wherein the first hinge of the top member is generally adjacent to a center portion of the bottom member when the frame is in the second, collapsed position.

15. The collapsible soft crate of claim 13, wherein the center portion of the top member is laterally displaced towards the center of the frame with respect to the end portions and the bottom member.

16. The collapsible soft crate of claim 13, wherein the two end portions and the center portion of top member extend generally parallel to the bottom member when the crate is in the first, extended position.

17. The collapsible soft crate of claim 16, wherein the top member further includes two transitional portions that connect respective ones of the two end portions to the center portion and are angled with respect to the bottom member when the crate is in the first, extended position.

* * * * *